April 7, 1942. C. H. SUTHERLAND 2,279,148
COMMUTATOR COVER FOR DYNAMO-ELECTRIC MACHINES
Filed Jan. 15, 1941
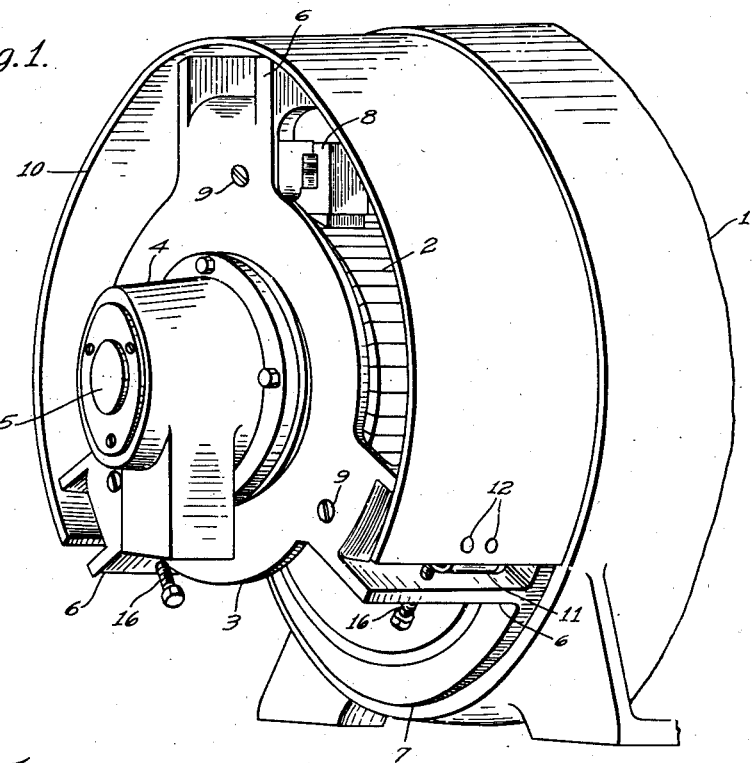
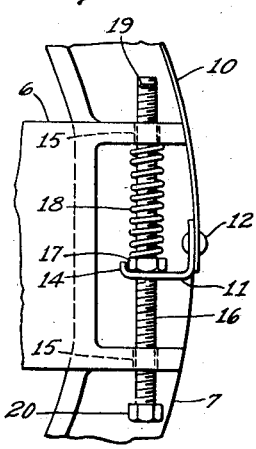
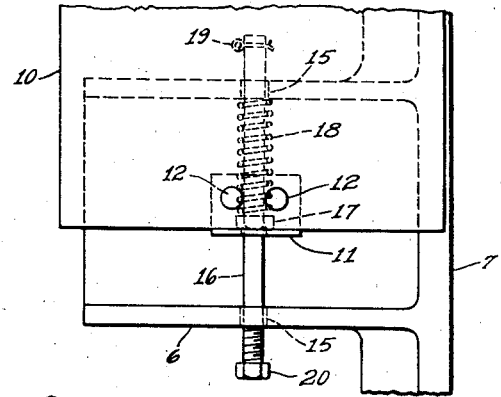
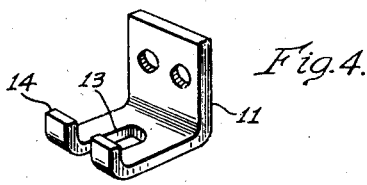
WITNESSES:
INVENTOR
Carl H. Sutherland.
BY
ATTORNEY Patented Apr. 7, 1942

2,279,148

UNITED STATES PATENT OFFICE 2,279,148

COMMUTATOR COVER FOR DYNAMO-ELECTRIC MACHINES

Carl H. Sutherland, Forest Hills, Pa., assignor to Westinghouse Electric & Manufacturing Company, East Pittsburgh, Pa., a corporation of Pennsylvania Application January 15, 1941, Serial No. 374,500

5 Claims. (Cl. 171—252)

The present invention relates to the construction of dynamo-electric machines of the commutator type, and more particularly to a cover for the commutator of such a machine.

The principal object of the invention is to provide a cover for the commutator of a dynamo-electric machine which will adequately protect the commutator against damage due to foreign objects, dirt, or water falling on it, and which is readily removable to permit access to the commutator and brushes.

Another object of the invention is to provide a commutator cover which is simple and inexpensive to manufacture, and which is constructed of parts which are cheap and readily obtainable.

Another object of the invention is to provide a commutator cover for a dynamo-electric machine which has a diameter equal to or less than that of the frame of the machine, so that the overall size of the machine is not increased.

A further object is to provide a commutator cover for a dynamo-electric machine in which no parts are riveted, welded, or otherwise permanently secured to the machine itself.

A still further object of the invention is to provide a commutator cover for a dynamo-electric machine which is releasably held in position on the machine by spring pressure, and in which the spring pressure is readily adjustable.

Other objects and advantages of the invention will be apparent from the following detailed description, taken in connection with the accompanying drawing, in which:

Figure 1 is a perspective view of the commutator end of a dynamo-electric machine, showing the commutator cover of the present invention;

Fig. 2 is a fragmentary end elevation of a portion of Fig. 1, illustrating the securing means for the commutator cover;

Fig. 3 is a fragmentary side elevation of the structure shown in Fig. 2; and

Fig. 4 is a perspective view of an attaching lug or bracket for the commutator cover.

The invention is shown in the drawing as applied to a dynamo-electric machine having a frame 1, which may be of any suitable construction. This machine may be either a direct-current generator or motor, or a commutator type alternating-current motor, having a commutator 2 at one end thereof. The other end of the machine may be of any desired construction, and has not been shown in the drawing, since its construction is immaterial to the present invention.

An end bracket 3 is provided at the commutator end of the machine, and a bearing unit 4 is mounted in the bracket to support the shaft 5 of the machine for rotation. The bracket 3 has at least three axially extending arms 6, which extend over the commutator 2, and which are connected at their ends by a circular flange 7, which is bolted or otherwise secured to the frame 1 of the motor. As clearly shown in the drawing, each of the arms 6 preferably has a channel-shaped cross-section with the open side towards the outside of the bracket, although it will be apparent that other shapes could be used. Brush arms and brush holders generally indicated at 8, of any suitable type may be secured to the end bracket by bolts 9.

In order to protect the commutator 2 from damage due to foreign objects falling on it, and to prevent dirt or water from falling on it, which might cause damage or operating difficulties, a cover 10 is provided for the commutator. The cover 10 is preferably formed from a strip of sheet metal having a width approximately equal to the length of the arms 6, so that it will completely cover the axial extent of the commutator, and it is bent into a generally circular shape having a diameter such that it fits closely over the arms 6. The diameter is preferably somewhat smaller than that of the frame 1. The cover 10 extends around the machine and partially overlaps the two lowermost arms of the end bracket 3, so that the commutator is protected on all sides except the bottom, where there is little danger of any foreign object striking it.

A securing lug or bracket 11 is fastened to each end of the cover 10 by means of rivets 12, or in any other suitable manner. These brackets are preferably made of steel, or they may be of any other suitable material, and, as shown in Fig. 4, they are generally L-shaped with a slot 13 cut in one leg, and the ends of the leg bent up, as indicated at 14, to form lips.

The cover 10 is releasably secured to the end bracket by securing means on the two lowermost arms 6. As clearly shown in Figs. 2 and 3, each of these arms 6 has holes 15 drilled through the walls of its channel-shaped cross-section, and a relatively long bolt 16, or other rod-like member, extends through these holes. A nut 17 is placed on the bolt at about its center, in position to engage the lug 11 on the cover 10. The nut 17 may be threaded on the bolt and may be secured in place in any suitable manner, as by soldering or welding, or any other type of engaging element may be used in place of a nut. A helical compression spring 18 is placed over the bolt 16 between the nut 17 and the wall of the bracket arm 6 on the side of the nut opposite to that which is to engage the lug 11. A cotter pin 19 may be inserted through a hole in the upper end of the bolt to prevent it from dropping out of the arm when the cover 10 is removed from the machine.

When the cover is to be placed in position on the end bracket of the machine, it is placed over the arms 6, on which it fits closely, and the lugs 11 are engaged under the nuts 17 on the bolts 16 in the two lowermost bracket arms 6. Each bolt 16 is manually pushed upward against the pressure of the spring 18 to permit such engagement, and the slot 13 in the lug 11 is slipped over the bolt, after which the bolt 16 is released so that the pressure of the spring 18 holds the nut 17 tightly against the lug 11 and thus retains the cover 10 in position on the end bracket. The bent up lips 14 on the lug prevent the cover from slipping off as a result of vibration, or other causes. When it is desired to remove the cover, it can readily be disengaged from the securing means simply by pushing upward on the bolts 16 against the pressure of the spring 18, which permits the lugs 11 to be disengaged from the bolts.

It should now be apparent that a commutator cover has been provided which is of very simple and inexpensive construction, and which can readily be removed from the machine when desired to permit access to the commutator and brushes for inspection or maintenance. The cover is releasably held in position on the machine by the pressure of the springs 18, and this spring pressure can easily be adjusted, if it is desired to do so, merely by placing washers under the nut 17 to increase the pressure of the spring. Since the cover 10 is of thin sheet metal, its diameter is substantially the same as the outside diameter of the end bracket, and it is thus within the diameter of the frame 1, so that the overall dimensions of the machine are not changed by the addition of the cover. The cover 10 can readily be applied to an existing machine without requiring any material changes in the machine, since it is not necessary to weld or rivet any parts to it, and no changes in the design of the machine are necessary. Thus, a very simple and advantageous construction is provided for protecting the commutator against damage due to falling objects.

Although a specific embodiment of the invention has been illustrated and described, it is to be understood that it is capable of various modifications and embodiments, and that the invention is not limited to the particular constructional details shown and described, but in its broadest aspects it includes all equivalent embodiments and modifications which come within the scope of the appended claims.

I claim as my invention:

1. In a dynamo-electric machine having a current-collecting device at one end thereof, an end bracket at said end of the machine having a plurality of arms extending axially over the current-collecting device, a cover member supported on said arms, said cover member having attaching means thereon, and releasable securing means carried by certain of said arms at the lower part of the end bracket and adapted to engage said attaching means.

2. In a dynamo-electric machine having a current-collecting device at one end thereof, an end bracket at said end of the machine having a plurality of arms extending axially over the current-collecting device, a cover member supported on said arms, said cover member comprising a sheet metal member of width approximately equal to the length of said arms fitting closely over the arms and having attaching means thereon, and releasable securing means carried by certain of the arms at the lower part of the end bracket and adapted to engage said attaching means.

3. In a dynamo-electric machine having a current-collecting device at one end thereof, an end bracket at said end of the machine having a plurality of arms extending axially over the current-collecting device, and a cover member supported on said arms, said cover member comprising a sheet metal member of width approximately equal to the length of said arms fitting closely over the arms and having lugs at each end thereof for attachment of the cover to the machine, and releasable securing means on certain of the arms at the lower part of the end bracket for engagement with said lugs to hold the cover member in position.

4. In a dynamo-electric machine having a current-collecting device at one end thereof, an end bracket at said end of the machine having a plurality of arms extending axially over the current-collecting device, and a cover member supported on said arms, said cover member comprising a sheet metal member of width approximately equal to the length of said arms fitting closely over the arms and having lugs at each end thereof for attachment of the cover to the machine, the lowermost arm at each side of the end bracket having a hole therethrough, a securing member extending through said hole and adapted to engage one of said lugs on the cover member, and spring means for releasably holding said securing member in engagement with said lug.

5. In a dynamo-electric machine having a current-collecting device at one end thereof, an end bracket at said end of the machine having a plurality of arms extending axially over the current-collecting device, and a cover member supported on said arms, said cover member comprising a sheet metal member of width approximately equal to the length of said arms fitting closely over the arms and having lugs at each end thereof for attachment of the cover to the machine, the lowermost arm at each side of the end bracket having a hole therethrough, a bolt extending through said hole, a nut on said bolt in position to engage one of said lugs on the cover member, and a compression spring between the nut and the arm to releasably hold the bolt and nut in engagement with said lug.

CARL H. SUTHERLAND.